United States Patent [19]
Lee

[11] Patent Number: 5,469,883
[45] Date of Patent: Nov. 28, 1995

[54] FLOW MODULATION DEVICE HAVING AN ELASTICALLY DEFORMABLE DISK-LIKE FLAP

[75] Inventor: Seung H. Lee, Seoul, Rep. of Korea

[73] Assignee: Daewoo Heavy Industries Ltd., Incheon, Rep. of Korea

[21] Appl. No.: 345,753

[22] Filed: Nov. 22, 1994

[30] Foreign Application Priority Data

Nov. 22, 1993 [KR] Rep. of Korea .................. 93-24589

[51] Int. Cl.⁶ .................................................. G05D 7/01
[52] U.S. Cl. .................. 137/513.3; 137/498; 137/504; 137/517; 137/854
[58] Field of Search ............................. 137/498, 504, 137/513.3, 517, 854

[56] References Cited

U.S. PATENT DOCUMENTS

| | | | |
|---|---|---|---|
| 2,777,464 | 1/1957 | Mosely | 137/854 X |
| 2,948,296 | 8/1960 | Thorburn | 137/517 |
| 3,661,175 | 5/1972 | Tillman | 137/517 |
| 3,886,968 | 6/1975 | Murrell | 137/504 X |
| 4,456,029 | 6/1984 | McCrum | 137/498 |
| 5,072,648 | 12/1991 | Krahn et al. | |

Primary Examiner—Robert G. Nilson
Attorney, Agent, or Firm—Lowe, Price, LeBlanc & Becker

[57] ABSTRACT

A flow modulation device is provided for restricting fluid flow exhausted from a first, actuator-sided conduit toward a second, reservoir-sided conduit to an acceptable rate in the event of sudden pressure drop within the second conduit. The flow modulation device comprises a body including a first end wall and a first cylindrical side wall extending from the end wall toward the second conduit, the first end wall having an inlet port coupled to the first conduit; a socket fluid-tightly connected to the body to define a fluid chamber therebetween, the socket including a second end wall and a second cylindrical side wall extending from the second end wall into the first cylindrical side wall, the second side wall having at its distal end an abutment seat spaced apart from the first end wall, the second end wall having an axial aperture; a nipple sealingly fitted through the axial aperture of the socket to protrude into the fluid chamber, the nipple having an outlet port through which the fluid chamber is in communication with the second conduit; and an elastically deformable disk-like flap detachably mounted to an internal free end of the nipple, the disk-like flap having at least one orifice and a peripheral edge of generally circular shape, the peripheral edge lying adjacent to the abutment seat of the socket.

11 Claims, 5 Drawing Sheets

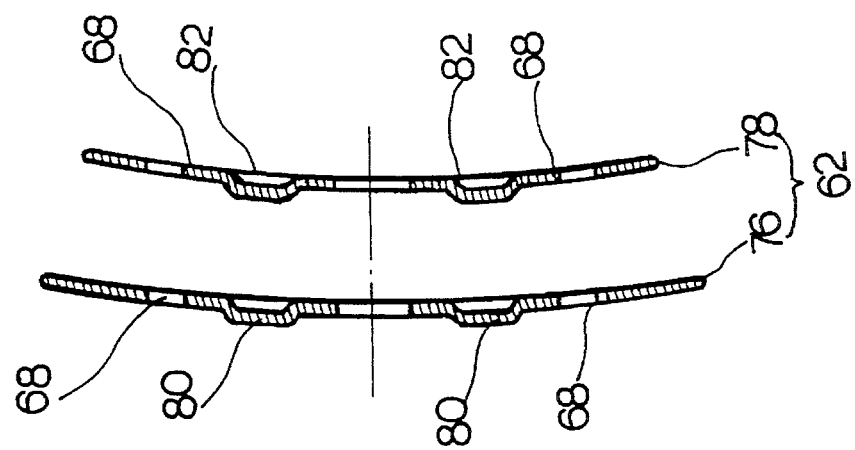
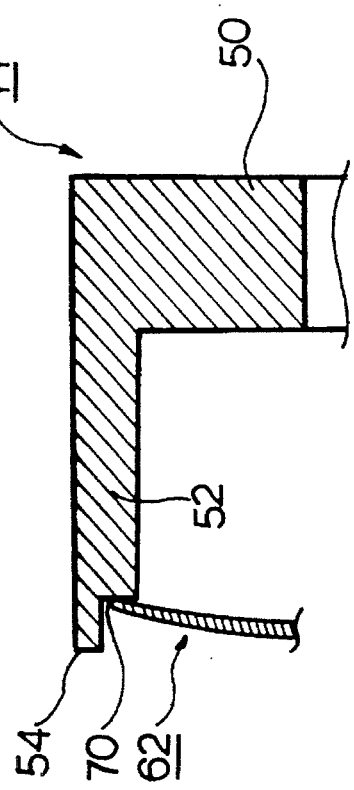
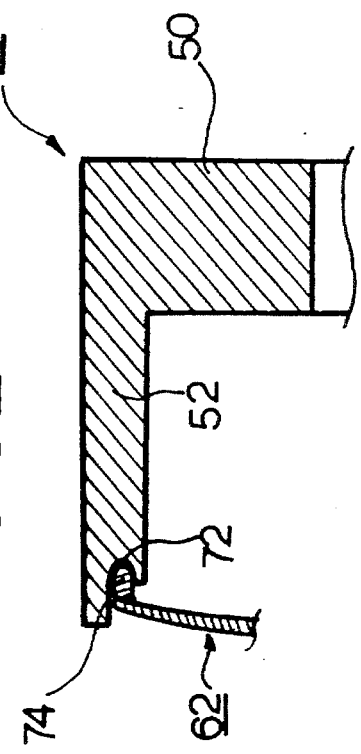

FLOW MODULATION DEVICE HAVING AN ELASTICALLY DEFORMABLE DISK-LIKE FLAP

FIELD OF THE INVENTION

The present invention is generally concerned with a flow modulation device, and more particularly with a flow restrictor valve connected to and between a first, actuator-sided conduit and a second, reservoir-sided conduit in such a manner that it can restrict the magnitude of fluid flow evacuated from the first conduit to an acceptable rate in the event of failure of the second conduit.

DESCRIPTION OF THE PRIOR ART

Fluid leakage as a result of flow delivery line breakage in, e.g., forklift trucks may lead to a severe hazard to the loads borne by the trucks as well as the human bodies of in-site workers. Stated in more specific way, should a fluid delivery line extending between a reservoir and a lift cylinder of the forklift trucks be broken, the lift cylinder would be retracted abruptly to cause sudden descent of a lift carriage along with its loads, which would adversely affect the structural integrity of componentry and the safety of workers doing jobs in site. To cope with such an unexpected accident, use has been made of flow modulation devices that can act to significantly reduce cross-sectional area of a fluid passageway to thereby avoid the dangers attendant to the flow delivery line breakage.

As a representative prior art example, a flow modulation valve of the class as illustrated in FIG. 1 is customarily put into practical use in the art. As shown, the flow modulation valve includes a body 10 and a nipple 14 fluid-tightly combined with the body 10 to define a fluid chamber 12 therebetween. The body 10 is provided with an inlet port 16 through which pressurized fluid may be admitted into the fluid chamber 12, the nipple 14 having an outlet port 18 through which the fluid may be discharged from the fluid chamber 12. Inserted within the fluid chamber 12 are a nipple stopper 20 and a plunger 22 displaceable relative to the nipple stopper 20. A compression spring 24 is retained between the nipple stopper 20 and the plunger 22 to bias the latter away from the former. The nipple stopper 20 has a relatively large-sized aperture 26 in the side wall thereof and an orifice 28 in its end wall, with the plunger having an axial opening 30 of relatively large diameter.

In operation, if the inlet fluid pressure is exceedingly greater than the outlet fluid pressure, the plunger 22 would be caused to move toward the nipple stopper 20 against the resistant force of the compression spring 24, eventually coming into contact with the end wall of the nipple stopper 20. As a result, the pressurized fluid in the inlet port 16 is so smoothly and gradually passed to the outlet port 18 as to avoid sudden fluid pressure drop. Use of the flow modulation valve exemplified in FIG. 1, however, requires a large number of precisely machined component parts, which would necessarily lead to an increased complexity in structure, costliness in manufacture and a reduced dependability in long-term operation.

U.S. Pat. No. 5,072,648 to Krahn et al. dated Dec. 17, 1991, the disclosure of which is incorporated herein by reference, teaches a control system for a fluid operated jack that can reduce the speed of retraction of a piston rod of the jack to an acceptable rate during a preselected range of operation by adding pressurized fluid flow to the fluid being exhausted from the jack through a flow restrictor valve to the reservoir. As set forth on lines 21–42 of column 8 of the '648 patent, the restrictor valve is a pressure compensated flow control valve for limiting the magnitude of fluid flow delivered to the reservoir. Although the behavior of the restrictor valve is described in somewhat detail in the above-referenced U.S. patent, it remains silent on the structural details of the restrictor valve, per se.

SUMMARY OF THE INVENTION

It is an object of the present invention to provide a flow modulation device that can be readily fabricated without sacrificing the cost of manufacture and is capable of maintaining reliability for an extended period of service time.

Another object of the invention is to provide a flow modulation device for forklift trucks that has an ability to avoid abrupt descent of a lift carriage and its attendant loads in the event of failure of a reservoir-sided conduit and further that has a simplified configuration with enhanced operational dependability.

With these objects in view, the present invention provides a flow modulation device for restricting fluid flow exhausted from a first, actuator-sided conduit toward a second, reservoir-sided conduit to an acceptable rate in the event of sudden pressure drop within the second conduit, which comprises: a body including a first end wall and a first cylindrical side wall extending from the end wall toward the second conduit, the first end wall having an inlet port coupled to the first conduit; a socket fluid-tightly connected to the body to define a fluid chamber therebetween, the socket including a second end wall and a second cylindrical side wall extending from the second end wall into the first cylindrical side wall, the second side wall having at its distal end an abutment seat spaced apart from the first end wall, the second end wall having an axial aperture; a nipple sealingly fitted through the axial aperture of the socket to protrude into the fluid chamber, the nipple having an outlet port through which the fluid chamber is in communication with the second conduit; and an elastically deformable disk-like flap detachably mounted to an internal free end of the nipple, the disk-like flap having at least one orifice and a peripheral edge of generally circular shape, the peripheral edge lying adjacent to the abutment seat of the socket.

BRIEF DESCRIPTION OF THE DRAWINGS

Other objects, features and advantages of the invention will become apparent from the following description of the preferred embodiment taken in conjunction with the accompanying drawings, in which:

FIGS. 7A and 7B are partial cut away sectional view illustrating first and second modified embodiments of the socket; and FIG. 8 depicts a modification of the disk-like flap consisting of two similarly shaped disks of different size that are combined together to improve rigidity of the flap.

DETAILED DESCRIPTION OF THE PREFERRED EMBODIMENT

Figure 1:
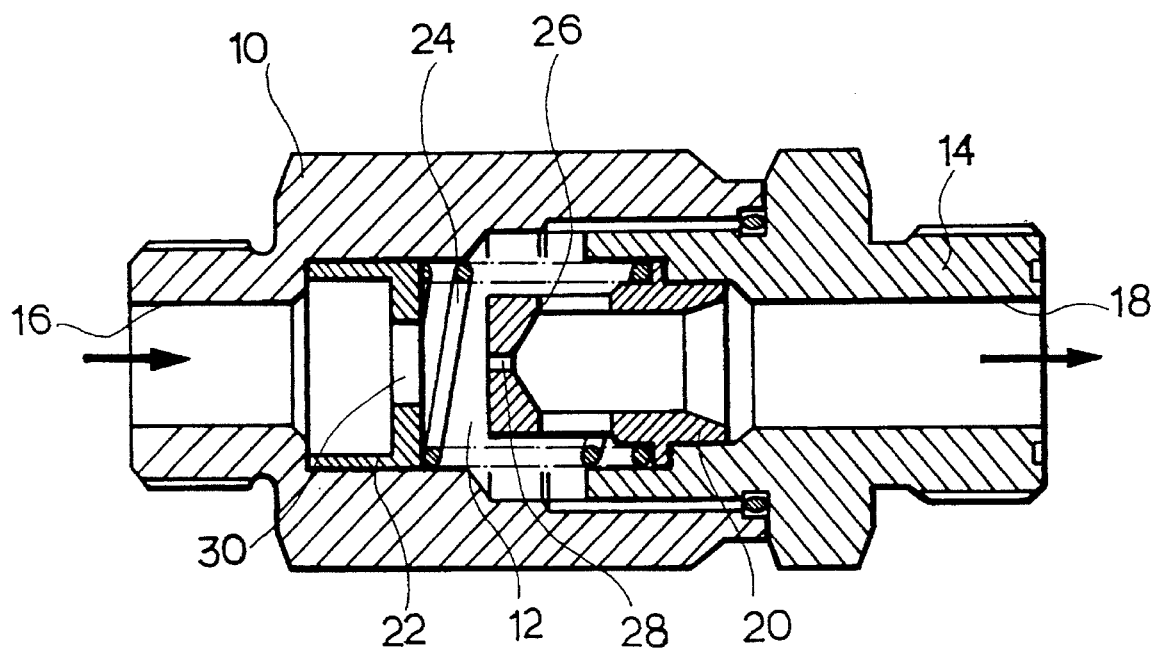
FIG. 1 shows, in cross-section, an exemplary prior art device of restricting fluid flow typically used in the art of fluid control.
Figure 2:
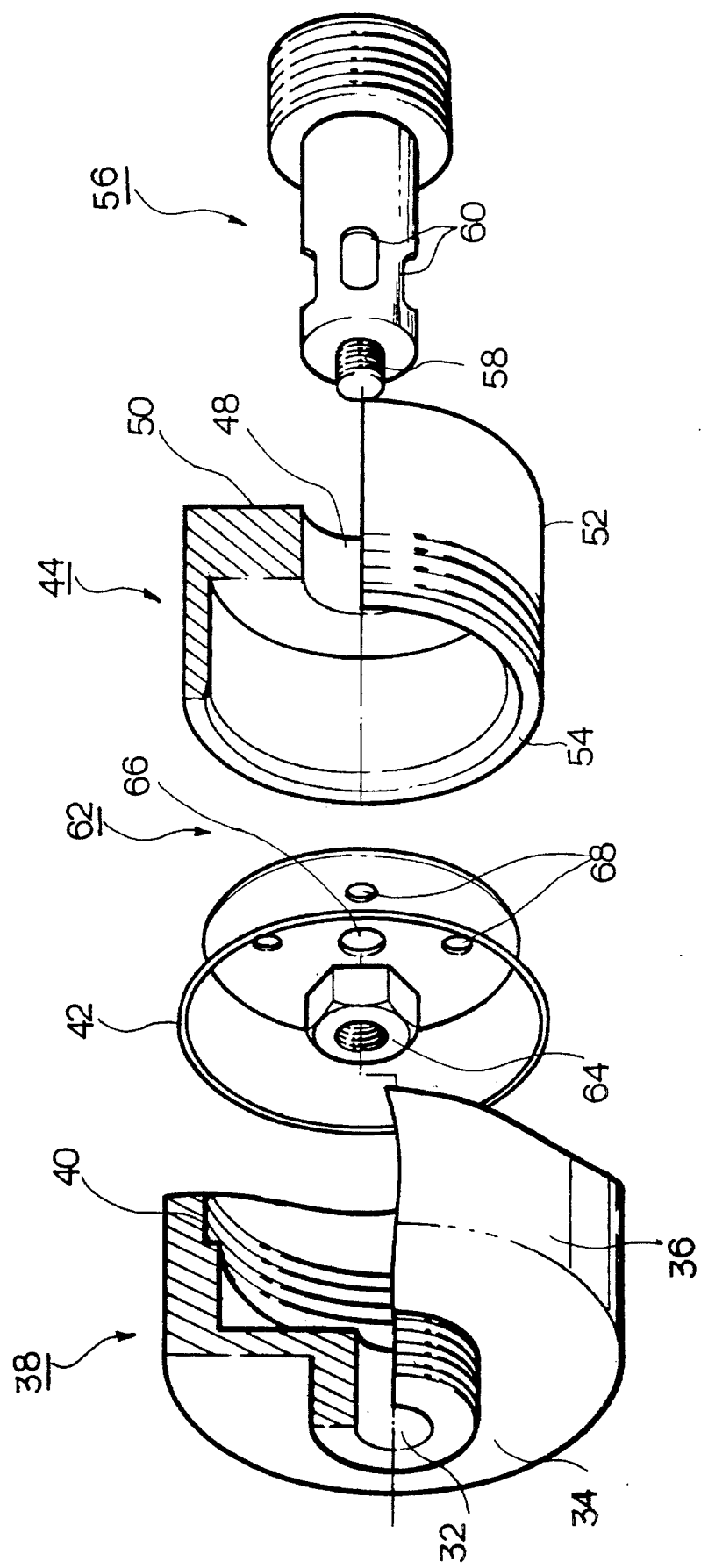
FIG. 2 is a partially cut away perspective view of the flow modulation device embodying the invention.

Referring now to FIG. 2, there is shown a flow modulation device constructed in accordance with the instant invention. Although the flow modulation device will be described hereinbelow in connection with a forklift truck, it should be appreciated that many other applications than the forklift truck may be contemplated to apply the inventive device. In the forklift truck application, the flow modulation device can serve to restrict fluid flow exhausted from a first, actuator-sided conduit (not shown) toward a second, reservoir-sided conduit (also not shown) to an acceptable rate, in the event of sudden pressure drop within the second conduit.

Figure 3:
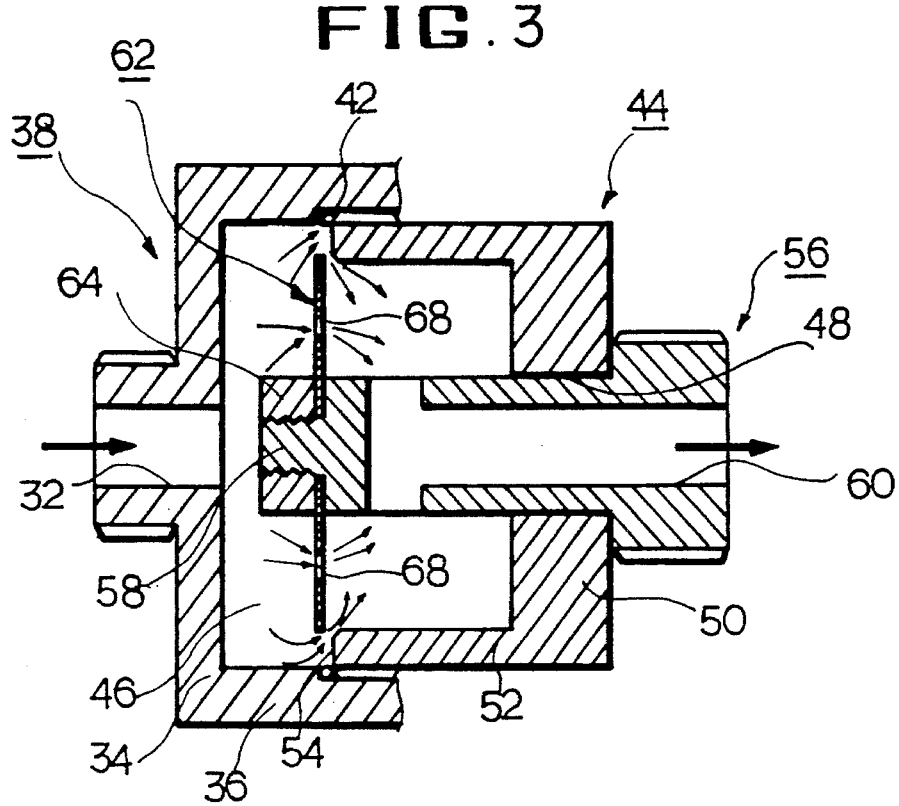
FIG. 3 is a sectional view of the flow modulation device shown in FIG. 2, with the disk-like flap kept in a non-deformed flat configuration.
Figure 4:
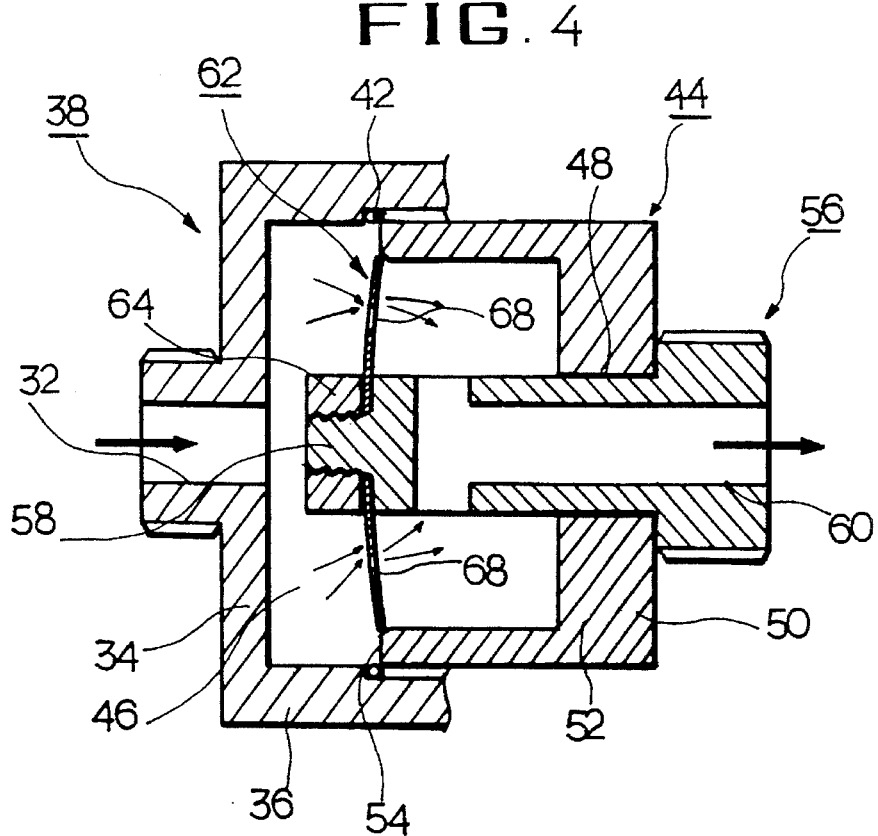
FIG. 4 is a view similar to FIG. 3 but showing the disk-like flap flexurally deformed into contact with the abutment seat of the socket at its peripheral edge.

As best seen in FIGS. 2 through 4, the flow modulation device includes, but is not limited to, a body 38 that consists of a first end wall 34 and a first cylindrical side wall 36 extending from the end wall 34 toward the second conduit. The first end wall 34 has an inlet port 32 coupled to the first conduit to introduce pressurized fluid therethrough. Provided on the inner circumference of the first cylindrical side wall 36 is a step portion 40 over which a sealing element, e.g., rubber ring 42 may be placed to prevent the pressurized fluid from leakage.

A generally cup-shaped socket 44 is fluid-tightly combined to the body 38, with the rubber ring 42 interposed therebetween, to define a fluid chamber 46 as clearly shown in FIGS. 3 and 4. The socket 44 is composed of a second end wall 50 and a second cylindrical side wall 52 extending from the second end wall 50 into the first side wall 36, the end wall 50 having an axial aperture 48 at its center. The second side wall 52 is provided at its distal end with an abutment seat 54 whose radially outward edge rests against the rubber ring 42 and whose radially inward edge is bevelled or chamfered at an angle.

A nipple 56 is sealingly fitted through the axial aperture 48 of the socket 44 to protrude into the fluid chamber 46 and fixedly secured to the socket 44 by a suitable fastener which is not illustrated in the drawings. The nipple 56 has a externally threaded free end 58 and a longitudinally extending outlet port 60 which is open to the fluid chamber 46 at one end and connected to the reservoir-sided conduit at the other end.

An elastically deformable disk-like flap 62 is detachably mounted to the free end 58 of the nipple 56 by virtue of a nut 64. Such a mounting technique assures easier maintenance and quick replacement of the disk-like flap 62 when such need arises. The disk-like flap 62 has a peripheral edge of circular configuration that would normally remain spaced apart from the abutment seat 54 to leave an annular fluid leakage gap therebetween.

The disk-like flap 62 may be made of high modulus material, e.g., sheet metal or synthetic resin chemically compatible with the working fluid, namely, oil. It would be possible to use a number of stacked disks, where a reinforced flap is required to meet an exceedingly high pressure environment. Preferably, the disk-like flap 62 should have a rigidity enough not to be flexurally deformed in case where pressure differential ΔP developed between the inlet and outlet ports 16, 18 is kept below a predetermined value but have a flexibility enough to be flexurally deformed into contact with the abutment seat 54 at its peripheral edge in case where the pressure differential ΔP exceeds the predetermined value.

Figure 5:
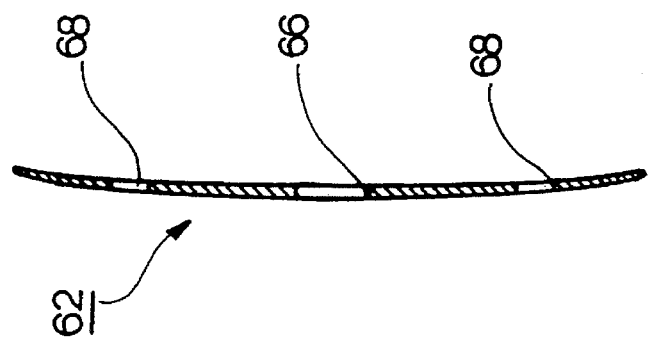
FIG. 5 is an enlarged sectional view showing the disk-like flap employed in the preferred embodiment of the invention.

Additionally, the disk-like flap 62 should have a diameter of less than the internal diameter of the first cylindrical side wall 36 and greater than the internal diameter of the second cylindrical side wall 52. As is apparent from FIG. 5, it is preferred that the disk-like flap 62 has a tapering cross-sectional shape with the greatest thickness at its center and the smallest thickness at the peripheral edge thereof. As an alternative, the disk-like flap 62 may be fabricated from a disk of uniform thickness.

The disk-like flap 62 is provided at its center with an opening 66 through which the threaded free end 58 of the nipple 56 may be inserted and one or more orifices 68 at radially outward region of the opening 66. In the embodiment shown in FIGS. 2 and 6, the orifices 68 include a plurality of e.g., four circular holes uniformly disposed along an imaginary circle which extends with an appropriate spacing from the peripheral edge of the disk-like flap 62.

The orifices 68 play a part in squeezing the fluid flow as the disk-like flap 62 is subject to flexural deformation by the action of rapidly flowing fluid, viz., when the peripheral edge of the disk-like flap 62 comes into close contact with the abutment seat 54 of the socket 44 to eliminate the fluid annular leakage gap which would otherwise be present therebetween. The sum area of the orifices 68 is a controlling parameter that heavily affects the flow rate of the pressurized fluid and, therefore, should be carefully selected to make the pressurized fluid pass slowly through the orifices 68 in the event of failure of the reservoir-sided flow delivery line. Desirably, the orifices 68 should have as small a sum area as possible, to avoid abrupt drainage of the fluid in an emergency situation like the flow line breakage.

Figure 6B:
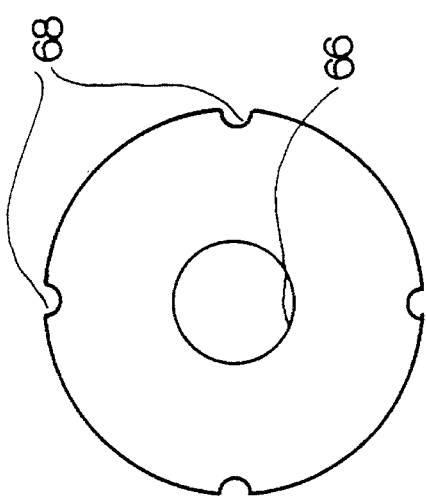
FIG. 6A is a plan view of the disk-like flap as illustrated in FIG. 5, with FIGS. 6B through 6D showing first, second and third variants of the disk-like flap, respectively.
Figure 6D:
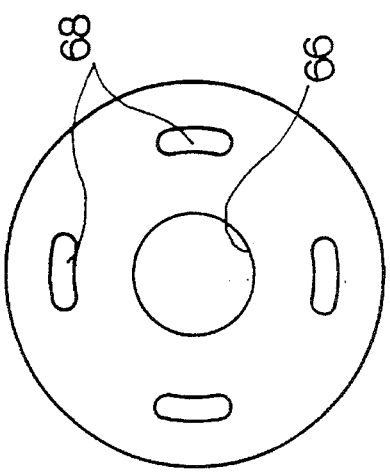
Figure 6A:
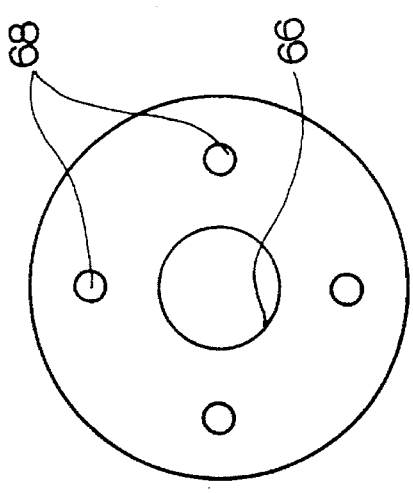
Figure 6C:
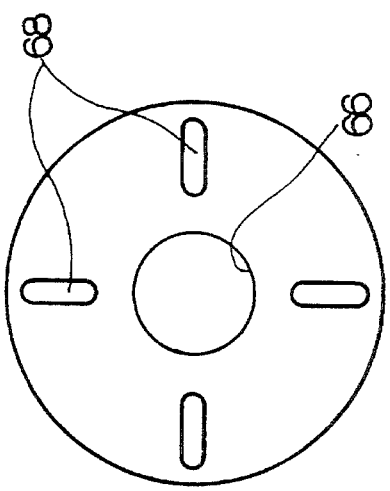

FIG. 6B. shows a first variant of the disk-like flap 62 wherein the orifices 68 include four semicircular cutout uniformly spaced along the peripheral edge of the disk-like flap 62. FIG. 6C illustrates a second variant of the disk-like flap 62, according to which the orifices 68 consist of four radially extending slots equally spaced apart from one an other. FIG. 6D depicts a third variant of the disk-like flap 62 that has four arcuate slots substantially uniformly distributed along an imaginary circle which extends with an appropriate spacing from the peripheral edge of the disk-like flap 62. It should be understood that the number, shape and arrangement of the orifices 68 may vary with the environment under which the disk-like flap 62 is used.

FIG. 7A is a partial cross-sectional view showing a first modification of the socket 44 in which a step-like annular cutout 70 is provided along the abutment seat 54 of the socket 44. FIG. 7B shows a second modification of the socket 44 wherein an annular groove 72 extends along the abutment seat 54, with an annular ring 74 of compliant material held in place on the groove 72 to assure leakage-free contact of the peripheral edge of the disk-like flap 62.

Shown in FIG. 8 is a modified embodiment of the disk-like flap 62 that consists of a large diameter disk 76 and a small diameter disk 78 bonded to the large diameter disk 76 adhesively or by welding, etc. Preferably, the large diameter disk 76 should have an annular locator recess 80, with the small diameter disk having a complimentary locator recess 82. These recesses 80, 82 assist in achieving exact arrangement between the orifices 68 of each of the disks 76, 78 in the process of combining them together.

The flow modulation device set forth above is operable in the following way. As long as the pressure differential ΔP between the inlet and outlet ports 32, 60 remains no greater than a predetermined value, the disk-like flap 62 would experience no flexural deformation to thereby leave an annular leakage gap between the peripheral edge of the flap 62 and the abutment seat 54 of the socket 44, as best shown in FIG. 3. Accordingly, the pressurized fluid would flow through the annular leakage gap as well as the orifices 68 without any appreciable restriction in flow rate.

In the event that the reservoir-sided flow delivery line should fail, however, the pressure differential ΔP between the inlet and outlet ports 32, 60 tends to increase abruptly due to a sudden pressure drop in the outlet port 60. As a consequence, the pressurized fluid comes to flow fast to thereby exert forces on the disk-like flap 62. This would cause the peripheral edge of the flap 62 to be flexurally deformed into contact with the abutment seat 54 of the socket 44 as depicted in FIG. 4, thus eliminating the annular leakage gap between the peripheral edge of the flap 62 and the abutment seat 54 of the socket 44. Accordingly, the pressurized fluid is leaked or squeezed through the orifices 68 alone at a reduced flow rate so that any abrupt retraction of the lift cylinder can be avoided, thus achieving slow descent of the lift carriage and its attendant loads.

While the invention has been shown and described with reference to a preferred embodiment, it should be apparent to those skilled in the art that many changes and modifications may be made without departing from the scope of the invention as defined in the claims.

What is claimed is:

1. A flow modulation device for restricting fluid flow exhausted from a first, actuator-sided conduit toward a second, reservoir-sided conduit to an acceptable rate in the event of sudden pressure drop within the second conduit, which comprises:

a body including a first end wall and a first cylindrical side wall extending from the end wall toward the second conduit, the first end wall having an inlet port coupled to the first conduit;

a socket fluid-tightly connected to the body to define a fluid chamber therebetween, the socket including a second end wall and a second cylindrical side wall extending from the second end wall into the first cylindrical side wall, the second side wall having at its distal end an abutment seat spaced apart from the first end wall, the second end wall having an axial aperture;

a nipple sealingly fitted through the axial aperture of the socket to protrude into the fluid chamber, the nipple having an outlet port through which the fluid chamber is in communication with the second conduit; and an elastically deformable disk-like flap detachably mounted to an internal free end of the nipple, the disk-like flap having at least one orifice and a peripheral edge of generally circular shape, the peripheral edge lying adjacent to the abutment seat of the socket so that it can normally remain out of contact with the abutment seat to leave an annular fluid leakage gap therebetween and, in the event of sudden pressure drop within the second conduit, come into contact with the abutment seat to eliminate the fluid leakage gap.

2. The flow modulation device as recited in claim 1, wherein the disk-like flap has a diameter of less than the internal diameter of the first cylindrical side wall and greater than the internal diameter of the second cylindrical side wall.

3. The flow modulation device as recited in claim 2, wherein the disk-like flap is composed of a first disk and a second disk fixedly attached to the first disk in a face-to-face relationship therewith, the first disk greater in diameter than the second disk.

4. The flow modulation device as recited in claim 2, wherein the abutment seat of the socket is chamfered to assure leakage-free contact of the peripheral edge of the disk-like flap with the abutment seat.

5. The flow modulation device as recited in claim 2, wherein the abutment seat of the socket has an annular groove and wherein a compliant annular ring is placed along the annular groove.

6. The flow modulation device as recited in claim 2, wherein the disk-like flap has a rigidity enough not to be flexurally deformed in case where pressure differential developed between the inlet and outlet ports is kept below a predetermined value and a flexibility enough to be flexurally deformed into contact with the abutment seat in case where the pressure differential exceeds the predetermined value.

7. The flow modulation device as recited in claim 6, wherein the disk-like flap has a tapering cross-sectional shape with a greatest thickness at its center and a smallest thickness at the peripheral edge thereof.

8. The flow modulation device as recited in claim 6, wherein the orifice of the disk-like flap includes a plurality of circular holes uniformly distributed along an imaginary circle which extends with a spacing from the peripheral edge of the disk-like flap.

9. The flow modulation device as recited in claim 6, wherein the orifice of the disk-like flap includes a plurality of semicircular cutouts uniformly spaced along the peripheral edge of the disk-like flap.

10. The flow modulation device as recited in claim 6, wherein the orifice of the disk-like flap includes a plurality of radially extending slots equally spaced apart from one another.

11. The flow modulation device as recited in claim 6, wherein the orifice of the disk-like flap includes a plurality of arcuate slots uniformly distributed along an imaginary circle which extends with a spacing from the peripheral edge of the disk-like flap.

* * * * *